United States Patent
Atarashiya et al.

(10) Patent No.: US 11,835,827 B2
(45) Date of Patent: Dec. 5, 2023

(54) LIQUID CRYSTAL DEVICE AND ELECTRONIC APPARATUS

(71) Applicant: Japan Display Inc., Tokyo (JP)

(72) Inventors: Takao Atarashiya, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/459,439

(22) Filed: Aug. 27, 2021

(65) Prior Publication Data

US 2021/0389632 A1    Dec. 16, 2021

Related U.S. Application Data

(63) Continuation of application No. 16/509,206, filed on Jul. 11, 2019, now Pat. No. 11,126,041, which is a
(Continued)

(30) Foreign Application Priority Data

Mar. 6, 2008  (JP) ................................. 2008-055867
Jan. 20, 2009  (JP) ................................. 2009-009615

(51) Int. Cl.
  *G02F 1/1343*    (2006.01)
  *G02F 1/1333*    (2006.01)
  (Continued)

(52) U.S. Cl.
  CPC ...... *G02F 1/134363* (2013.01); *G02F 1/1368* (2013.01); *G02F 1/13439* (2013.01);
  (Continued)

(58) Field of Classification Search
  CPC .............................................. G02F 1/134372
  See application file for complete search history.

(56) References Cited

U.S. PATENT DOCUMENTS 5,185,601 A    2/1993    Takeda et al.
5,285,301 A    2/1994    Shirahashi et al.
(Continued)

FOREIGN PATENT DOCUMENTS

CN    100507693 A    10/2002
CN    1403859        3/2003
(Continued)

OTHER PUBLICATIONS

IPR 2021-01029, Defendant Tianma's Preliminary Invalidity Contentions dated Mar. 3, 2021. (Year: 2021).*

(Continued)

*Primary Examiner* — Michael Stahl
(74) *Attorney, Agent, or Firm* — K&L Gates LLP

(57) ABSTRACT

A liquid crystal includes first and second substrates, the first substrate including intersecting data lines and scan lines. A liquid crystal layer is sandwiched therebetween. Also, a plurality of sub-pixels districted by data lines and gate lines, and arranged along the long-axis and the short-axis directions in a matrix. A pixel electrode in the sub-pixels includes a central portion. A common electrode including linear electrodes arranged along the data lines and disposed with gaps therebetween. Sub-pixels are bent at the center portion, such that the linear electrodes or the gaps in both sides of the sub-pixels are inclined in opposite directions with respect to the long-axis direction. At least one of the linear electrodes or at least one of the gaps has a bent portion at the central portion of the respective pixel electrode. The common electrode is provided on liquid crystal layer side over the pixel electrode.

9 Claims, 11 Drawing Sheets

Related U.S. Application Data continuation of application No. 15/683,335, filed on Aug. 22, 2017, now Pat. No. 10,353,250, which is a continuation of application No. 15/064,169, filed on Mar. 8, 2016, now Pat. No. 9,766,515, which is a continuation of application No. 14/549,189, filed on Nov. 20, 2014, now Pat. No. 9,310,654, which is a continuation of application No. 12/397,408, filed on Mar. 4, 2009, now Pat. No. 8,922,741.

(51) Int. Cl.
   *G02F 1/1335*   (2006.01)
   *G02F 1/1368*   (2006.01)

(52) U.S. Cl.
   CPC .. *G02F 1/133345* (2013.01); *G02F 1/133512* (2013.01); *G02F 1/134345* (2021.01); *G02F 1/134372* (2021.01); *G02F 2201/40* (2013.01)

(56) References Cited

U.S. PATENT DOCUMENTS

| | | | |
|---|---|---|---|
| 5,781,261 A | 7/1998 | Ohta et al. | |
| 5,859,683 A | 1/1999 | Tagusa et al. | |
| 5,995,189 A | 12/1999 | Zhang | |
| 6,097,467 A | 8/2000 | Fujimaki | |
| 6,111,625 A | 8/2000 | Ohta et al. | |
| 6,124,917 A | 9/2000 | Fujioka et al. | |
| 6,188,458 B1 | 2/2001 | Tagusa et al. | |
| 6,208,399 B1 | 3/2001 | Ohta et al. | |
| 6,219,115 B1 | 4/2001 | Nakayoshi et al. | |
| 6,222,595 B1 | 4/2001 | Zhang et al. | |
| 6,233,034 B1 | 5/2001 | Lee et al. | |
| 6,266,118 B1 | 7/2001 | Lee et al. | |
| 6,281,953 B1 | 8/2001 | Lee et al. | |
| 6,292,237 B1 | 9/2001 | Hebiguchi | |
| 6,297,867 B1 | 10/2001 | Miyahara et al. | |
| 6,335,770 B1 | 1/2002 | Komatsu | |
| 6,335,771 B1 | 1/2002 | Hiraishi | |
| 6,341,003 B1 | 1/2002 | Ashizawa et al. | |
| 6,346,932 B1 | 2/2002 | Maeda | |
| 6,356,330 B1 | 3/2002 | Ando et al. | |
| 6,392,622 B1 | 5/2002 | Ozawa | |
| 6,404,475 B1 | 6/2002 | Nakayoshi et al. | |
| 6,411,360 B1 | 6/2002 | Matsuyama | |
| 6,445,435 B1 | 9/2002 | Seo et al. | |
| 6,449,026 B1 | 9/2002 | Min et al. | |
| 6,462,800 B1 | 10/2002 | Kim et al. | |
| 6,466,290 B2 | 10/2002 | Kim et al. | |
| 6,469,765 B1 | 10/2002 | Matsuyama et al. | |
| 6,483,566 B2 | 11/2002 | Youn et al. | |
| 6,532,053 B2 | 3/2003 | Ohta et al. | |
| 6,549,260 B1 | 4/2003 | Shibahara | |
| 6,577,368 B1 | 6/2003 | Yuh et al. | |
| 6,583,845 B1 | 6/2003 | Chung et al. | |
| 6,650,389 B1 | 11/2003 | Sakamoto | |
| 6,771,342 B1 | 8/2004 | Hirakata et al. | |
| 6,798,486 B2 | 9/2004 | Yanagawa et al. | |
| 6,833,897 B2 | 12/2004 | Lee et al. | |
| 6,839,116 B2 | 1/2005 | Hong et al. | |
| 6,897,931 B2 | 5/2005 | Lee et al. | |
| 7,006,189 B2 | 2/2006 | Kim et al. | |
| 7,098,980 B2 | 8/2006 | Hirota | |
| 7,148,944 B2 | 12/2006 | Kinoshita et al. | |
| 7,173,281 B2 | 2/2007 | Hirakata et al. | |
| 7,282,091 B2 | 10/2007 | Hashimoto | |
| 7,327,411 B2 | 2/2008 | Yoon et al. | |
| 7,352,529 B2 | 4/2008 | Hibi et al. | |
| 7,495,648 B2 | 2/2009 | Kang et al. | |
| 7,551,256 B1 | 6/2009 | Seo | |
| 7,675,592 B2 | 3/2010 | Ochiai et al. | |
| 7,742,140 B2 | 6/2010 | Lee et al. | |
| 7,839,476 B2 | 11/2010 | Iwato et al. | |
| 8,053,171 B2 | 11/2011 | Maekawa et al. | |
| 8,064,022 B2 | 11/2011 | Kimura et al. | |
| 8,593,605 B2 | 11/2013 | Lee et al. | |
| 8,652,766 B2 | 2/2014 | Ishigaki et al. | |
| 8,823,911 B2 | 9/2014 | Nagano | |
| 8,830,429 B2 | 9/2014 | Ishigaki et al. | |
| 8,908,116 B2 | 12/2014 | Fujiyoshi et al. | |
| 9,146,424 B2 | 9/2015 | Kuriyama et al. | |
| 9,285,636 B2 | 3/2016 | Kunimatsu et al. | |
| 9,316,873 B2 | 4/2016 | Huh et al. | |
| 9,659,974 B2 | 5/2017 | Lin et al. | |
| 10,353,250 B2 | 7/2019 | Atarashiya et al. | |
| 2001/0009447 A1 | 7/2001 | Ohta et al. | |
| 2001/0030717 A1 | 10/2001 | Kaneko et al. | |
| 2001/0046003 A1 | 11/2001 | Song | |
| 2001/0046027 A1 | 11/2001 | Tai et al. | |
| 2002/0159016 A1 | 10/2002 | Nishida et al. | |
| 2003/0043327 A1 | 3/2003 | Aoyama et al. | |
| 2003/0081163 A1 | 5/2003 | Suzuki et al. | |
| 2003/0160750 A1 | 8/2003 | Ueda et al. | |
| 2004/0036833 A1 | 2/2004 | Monzen | |
| 2004/0145695 A1 | 7/2004 | Kurahashi et al. | |
| 2004/0183976 A1 | 9/2004 | Nagano et al. | |
| 2004/0239641 A1 | 12/2004 | Takahata et al. | |
| 2005/0046779 A1 | 3/2005 | Sumi et al. | |
| 2005/0099402 A1 | 5/2005 | Nakanishi et al. | |
| 2005/0099573 A1 | 5/2005 | Kubo et al. | |
| 2005/0105034 A1 | 5/2005 | Ono et al. | |
| 2005/0140897 A1 | 6/2005 | Kim | |
| 2005/0158665 A1 | 7/2005 | Maekawa et al. | |
| 2005/0179844 A1 | 8/2005 | Roosendaal et al. | |
| 2005/0259207 A1 | 11/2005 | Yang et al. | |
| 2005/0259210 A1 | 11/2005 | Lee et al. | |
| 2005/0264720 A1* | 12/2005 | Itou | G02F 1/133707 349/99 |
| 2005/0280753 A1 | 12/2005 | Kobayashi | |
| 2006/0170854 A1 | 1/2006 | Han et al. | |
| 2006/0055861 A1 | 3/2006 | Hirota | |
| 2006/0103412 A1 | 5/2006 | Kimura et al. | |
| 2006/0176434 A1 | 8/2006 | Kim et al. | |
| 2006/0226426 A1 | 10/2006 | Park et al. | |
| 2006/0290869 A1 | 12/2006 | Suzuki | |
| 2007/0040816 A1 | 2/2007 | Toyomaki | |
| 2007/0171319 A1 | 7/2007 | Fujita et al. | |
| 2007/0177090 A1 | 8/2007 | Shimomaki | |
| 2007/0200992 A1 | 8/2007 | Kim et al. | |
| 2007/0229749 A1 | 10/2007 | Kaneko et al. | |
| 2007/0236640 A1* | 10/2007 | Kimura | H01L 29/7869 257/E27.111 |
| 2007/0284627 A1 | 12/2007 | Kimura | |
| 2008/0002122 A1 | 1/2008 | Song et al. | |
| 2008/0007666 A1 | 1/2008 | Takeda et al. | |
| 2008/0007679 A1 | 1/2008 | Ochiai et al. | |
| 2008/0068539 A1 | 3/2008 | Kaneko et al. | |
| 2008/0074602 A1 | 3/2008 | Arai et al. | |
| 2009/0046234 A1 | 2/2009 | Tanaka | |
| 2009/0058784 A1 | 3/2009 | Shin et al. | |
| 2009/0207362 A1 | 8/2009 | Nagano | |
| 2009/0296037 A1 | 12/2009 | Tanaka et al. | |
| 2010/0079712 A1 | 4/2010 | Tanaka et al. | |
| 2010/0085287 A1 | 4/2010 | Shimomaki | |
| 2010/0157228 A1 | 6/2010 | Sakurai et al. | |
| 2011/0012821 A1 | 1/2011 | Ogura et al. | |
| 2012/0127148 A1 | 5/2012 | Lee et al. | |
| 2014/0192308 A1 | 7/2014 | Furukawa et al. | |
| 2015/0116623 A1 | 4/2015 | Tomioka et al. | |
| 2015/0116644 A1 | 4/2015 | Morishita et al. | |
| 2015/0138476 A1 | 5/2015 | Hyodo et al. | |
| 2016/0178980 A1 | 6/2016 | Zheng et al. | |
| 2017/0032748 A1 | 2/2017 | Tsuei et al. | |

FOREIGN PATENT DOCUMENTS

| | | |
|---|---|---|
| CN | 1420386 | 5/2003 |
| CN | 2735393 | 10/2005 |
| CN | 1704803 | 12/2005 |
| CN | 2789801 Y | 6/2006 |
| JP | H06186553 A | 7/1994 |
| JP | H09105918 A | 10/1995 |
| JP | 09-311334 | 12/1997 |
| JP | 10-307295 | 11/1998 |

(56) References Cited

FOREIGN PATENT DOCUMENTS

| | | |
|---|---|---|
| JP | H11119252 A | 4/1999 |
| JP | 2002215059 A | 12/2000 |
| JP | 2001-337339 | 12/2001 |
| JP | 2002-14374 | 1/2002 |
| JP | 2002357807 A | 12/2002 |
| JP | 2003075860 A | 3/2003 |
| JP | 2003-322869 | 11/2003 |
| JP | 2004-341465 A | 12/2004 |
| JP | 2005062472 A | 3/2005 |
| JP | 2005-196162 | 7/2005 |
| JP | 2006-058908 | 3/2006 |
| JP | 2007-003877 | 1/2007 |
| JP | 2007-018015 | 1/2007 |
| JP | 2007293155 A | 11/2007 |
| JP | 2008-209686 | 9/2008 |
| JP | 2010-256547 | 11/2010 |

OTHER PUBLICATIONS

IPR 2021-01029, Tianma Ex. 1010, Plaintiff's Infringement Contentions, 2:20-cv-00283,-00284,-00285 (EDTX). (Year: 2021).*
In Re Tianma Microelectronics Co., Ltd. v. Japan Display Inc., IPR2021-01029, Institution Decision entered Dec. 14, 2021. 22 pages.
Chinese Office Action dated May 18, 2010 in corresponding Chinese Application No. 200910004468.7.
Japanese Patent Office communication dated Dec. 25, 2012 for corresponding Japanese Patent Application No. 2009-009615.
U.S. Office Action dated May 29, 2020 in U.S. Appl. No. 16/509,194.
Remarks from Jul. 18, 2018 reply to Non-Final Office Action in U.S. Appl. No. 15/683,335, p. 8.

* cited by examiner

LIQUID CRYSTAL DEVICE AND ELECTRONIC APPARATUS

CROSS REFERENCES TO RELATED APPLICATIONS

This application is a continuation application of U.S. patent application Ser. No. 16/509,206, filed on Jul. 11, 2019, which is a continuation of U.S. patent application Ser. No. 15/683,335, filed on Aug. 22, 2017, issued as U.S. Pat. No. 10,353,250 on Jul. 16, 2019, which application is a continuation application of U.S. patent application Ser. No. 15/064,169, filed Mar. 8, 2016, which application is a continuation application of U.S. patent application Ser. No. 14/549,189, filed Nov. 20, 2014, issued as U.S. Pat. No. 9,310,654 on Apr. 12, 2016, which application is a continuation application of U.S. patent application Ser. No. 12/397,408 filed Mar. 4, 2009, issued as U.S. Pat. No. 8,922,741 on Dec. 30, 2014, which application claims priority to Japanese Patent Application No. 2009-009615 filed in the Japanese Patent Office on Jan. 20, 2009, and Japanese Patent Application No. 2008-055867 filed in the Japanese Patent Office on Mar. 6, 2008, the entire contents of which are incorporated herein by reference.

BACKGROUND

Technical Field

The invention relates to a liquid crystal device and an electronic apparatus.

Related Art

Hitherto, as one means for achieving a wide viewing angle of an liquid crystal device, there has been used a mode in which an electric field is applied to a liquid crystal layer in a direction of a substrate plane to thereby control alignment of liquid crystal molecules (such a mode will be referred to as a lateral electric field mode), and an IPS (In-Plane Switching) mode and an FFS (Fringe-Field Switching) mode have been known as such a lateral electric field mode. In a lateral electric field mode liquid crystal device, a pixel electrode and a common electrode are typically formed on the same substrate. In the case of the IPS mode, the pixel electrode and the common electrode are formed on the same layer and have a comb-teeth shape. On the other hand, in the case of the FFS mode, the pixel electrode and the common electrode are formed on different layers, respectively, and one of them has a comb-teeth shape and the other has a beta shape. In particular, in the case of the FFS mode, since the pixel electrode and the common electrode are formed on different layers, a strong electric field is generated from a fringe portion of the electrode in a direction inclined with respect to the substrate plane. Therefore, the FFS mode has a merit that the alignment of liquid crystal molecules disposed right above the electrode can be easily controlled compared with the IPS mode.

As a method for achieving a further wider viewing angle with the lateral electric field mode liquid crystal device, there is a known method that forms a plurality of regions, a so-called multi-domain, in which liquid crystal molecules within one sub-pixel are aligned in different directions upon voltage application (a region where liquid crystal molecules are aligned in approximately one direction is referred to as a domain). Since the viewing angle characteristics corresponding to inherent contrast ratios of respective domains are compensated by forming multiple domains, it is possible to achieve a wide viewing angle. In order to form a multi-domain structure, the shape of a comb-teeth shaped electrode needs to be studied. When electrode fingers constituting a comb-teeth shaped electrode are referred to as "linear electrodes," rather than arranging the entire linear electrodes within one sub-pixel to extend in the same direction, for example, as illustrated in FIG. 11, linear electrodes 101a corresponding an upper half part of one sub-pixel are arranged to be inclined toward the top left corner in FIG. 11 and linear electrodes 101b corresponding to a lower half part thereof are arranged to be inclined toward the bottom left corner. A electric field is generated in a direction perpendicular to the extending direction of the linear electrodes 101a and 101b upon application of an electric voltage. Liquid crystal molecules are caused to be aligned in accordance with the electric field. In the case of FIG. 11, two regions (the upper half part and the lower half part of the sub-pixel) where liquid crystal molecules are aligned in different directions are generated, whereby a dual-domain structure is achieved.

Here, since a uniform lateral electric field is generated in portions (encircled region indicated by symbol A in FIG. 11) of an liquid crystal layer disposed in the vicinity of the center portions of the linear electrodes 101a and 101b, images can be properly displayed. However, since lateral electric fields are generated in various directions in portions (encircled regions indicated by symbol B in FIG. 11) of the linear electrodes 101a and 101b disposed in the vicinity of end portions thereof, the alignment of the liquid crystals is disordered, and thus, light transmittance during bright display is remarkably deteriorated at these locations. Therefore, in this configuration, the area capable of substantially contributing to display is decreased, and thus, it is difficult to obtain a sufficient aperture ratio of the pixel and to achieve a high display luminance. In this respect, there is proposed a multi-domain liquid crystal display device in which in lieu of the configuration of FIG. 11 where the linear electrodes are arranged to extend in a short-axis direction of the sub-pixel, the linear electrodes are arranged to extend in the long-axis direction of the sub-pixel (see Japanese Unexamined Patent Application Publication No. 2002-014374). Specifically, the pixel electrode and the common electrode are arranged to extend in the long-axis direction of the sub-pixel so that they are bent several times.

According to the configuration disclosed in Japanese Unexamined Patent Application Publication No. 2002-014374, since the area of the end portions of the linear electrodes within one sub-pixel is small compared with the configuration illustrated in FIG. 11, it is possible to increase the area, which is able to substantially contribute to display, to thereby increase the aperture ratio of the pixel. However, since the pixel electrode and the common electrode are bent with respect to the sub-pixel having an approximately rectangular shape, there is generated a triangular dead space which does not contribute to display along the data line (the longer side of the sub-pixel), and thus, the aperture ratio is decreased in this portion. Consequently, there is a problem that it is difficult to achieve a high display luminance.

SUMMARY

An advantage of some aspects of the invention is that it provides a liquid crystal device having a high pixel aperture ratio, a high display luminance and a wide viewing angle and an electronic apparatus using the liquid crystal device.

According to an aspect of the invention, there is provided a liquid crystal device including a first substrate and a second substrate that are disposed to face each other; a liquid crystal layer that is sandwiched between the first substrate and the second substrate; a first electrode that is provided on the liquid crystal layer side of the first substrate; an insulating layer that is provided on the liquid crystal layer side of the first electrode; and a second electrode that is provided on the liquid crystal layer side of the insulating layer, in which the first substrate has formed thereon a plurality of data lines and a plurality of scan lines which intersect each other; sub-pixels are formed at regions surrounded by the data lines and the scan lines; the second electrode has a plurality of linear electrodes that is disposed with a gap therebetween; each of the plurality of linear electrodes extends in a long-axis direction of the sub-pixels and has at least one bent portion; the bent portion has such a shape that both sides thereof are inclined in opposite directions with respect to the long-axis direction of the sub-pixels; and the data lines or the scan lines are bent in an extending direction of the linear electrodes having the bent portion. Here, "sub-pixel" in the invention is a region which serves as the minimum unit of displaying an image. Moreover, the sub-pixels are provided so as to correspond to colored layers having different colors of color filters, and one pixel is formed by a plurality of adjacent sub-pixels.

According to the liquid crystal device of the above aspect of the invention, since each of the linear electrodes constituting the second electrode is generally arranged to extend in the long-axis direction of the sub-pixels and includes at least one bent portion, and the bent portion has such a shape that both sides thereof are inclined in opposite directions with respect to the long-axis direction of the sub-pixels, a multi-domain structure is formed, and thus, it is possible to achieve a wide viewing angle. Moreover, since the data line is bent in the extending direction of the linear electrodes having the bent portion, it is possible to suppress dead spaces which do not contribute to display from generating along the longer sides of the sub-pixel, and thus, a high aperture ratio can be maintained.

In the above aspect of the invention, the first electrode may be a pixel electrode and the second electrode may be a common electrode.

According to such a configuration, since the insulating layer is formed on the pixel electrode and the common electrode having a plurality of linear electrodes is formed on the surface of the insulating layer so as to cover the entire sub-pixels, it is possible to maximize the aperture ratio of the sub-pixels.

In the aspect of the invention, each of the plurality of linear electrodes may be linearly symmetric about a short-axis direction of the bent portion.

In the aspect of the invention, a region disposed between bent portions of two linear electrodes adjacent in a short-axis direction of the sub-pixels may be a gap between the two adjacent linear electrodes.

The configuration can be restated as follows: when the gap between two adjacent linear electrodes is referred to as a "slit," since the slit is formed between bent portions of the two adjacent linear electrodes, the configuration means that the slits are connected with each other across both sides of the bent portions in the long-axis direction of the sub-pixels. According to such a configuration, it is possible to maximize the aperture ratio of the sub-pixels.

Alternatively, a connection portion may be provided to a region disposed between bent portions of two adjacent linear electrodes in a short-axis direction of the sub-pixels so as to connect the two adjacent linear electrodes with each other.

The configuration can be restated as follows: the configuration means that the slits on both sides of the bent portions in the long-axis direction of the sub-pixels are divided by the connection portion. When the slits are connected with each other across both sides of the bent portions, there is a fear that it may cause problems that display defects resulting from an alignment disorder (disclination) of liquid crystals at the bent portions may spread or that the display defects may be unstably transferred to other positions upon application of an external force to the liquid crystal device. However, it is possible to solve the problems by dividing the slits on both sides of the bent portions by the connection portion.

In the above aspect of the invention, among the linear electrodes and the gaps alternately arranged in a short-axis direction of the sub-pixels, the linear electrode and the gap disposed at a region located close to the bent data line (or the bent scan line) may have a width larger than a width of the linear electrode and the gap disposed at a region located distant from the bent data line (or the bent scan line).

Alternatively, among the plurality of linear electrodes arranged in a short-axis direction of the sub-pixels, the linear electrode disposed at a region located close to the bent data line (or the bent scan line) may have a width larger than a width of the linear electrode disposed at a region located distant from the bent data line (or the bent scan line).

Alternatively, among a plurality of the gaps arranged in a short-axis direction of the sub-pixels, the gap disposed at a region located close to the bent data line (or the bent scan line) may have a width larger than a width of the gap disposed at a region located distant from the bent data line (or the bent scan line).

According to the configuration of the above aspect of the invention, although it is possible to provide a high aperture ratio, there is a fear that when a larger part of the outer border of the second electrode is located in close proximity of the data line, due to the influence of an electric field generated between the data line and the second electrode, the alignment of the liquid crystal molecules between them is disordered, thus leading to display defects. Therefore, when the width of at least one of the linear electrode and the gap disposed at a region located in the vicinity of the circumference of the sub-pixel and close to the data line is larger than the width of at least one of the linear electrode and the gap disposed at a region located in the vicinity of the center of the sub-pixel and distant from the data line, it is possible to make the second electrode less likely to be influenced by the data line to thereby suppress the alignment disorder of the liquid crystal molecules between them.

The liquid crystal device according to the above aspect may further include a light shielding film configured to overlap with the data line (or the scan line) which is at least bent in plan view, the light shielding film being provided on the first substrate.

According to such a configuration, since the data line and the light shielding film are formed on the first substrate, it is possible to perform the positional alignment between the data line and the light shielding film with a high accuracy compared with the case where the data line and the light shielding film are formed on different substrates. Accordingly, it is possible to achieve a high aperture ratio.

Further, the liquid crystal device may further include a light shielding film configured to overlap with the data line (or the scan line) which is at least bent in plan view, the light shielding film being provided on the second substrate.

According to another aspect of the invention, there is provided an electronic apparatus having the liquid crystal device according to the above aspect of the invention. According to such a configuration, it is possible to realize an electronic apparatus having a liquid crystal display unit capable of achieving a high display luminance and a wide viewing angle.

Additional features and advantages are described herein, and will be apparent from the following Detailed Description and the figures.

DETAILED DESCRIPTION

Embodiments of the present application will be described below in detail with reference to the drawings.

First Embodiment

Figure 1:
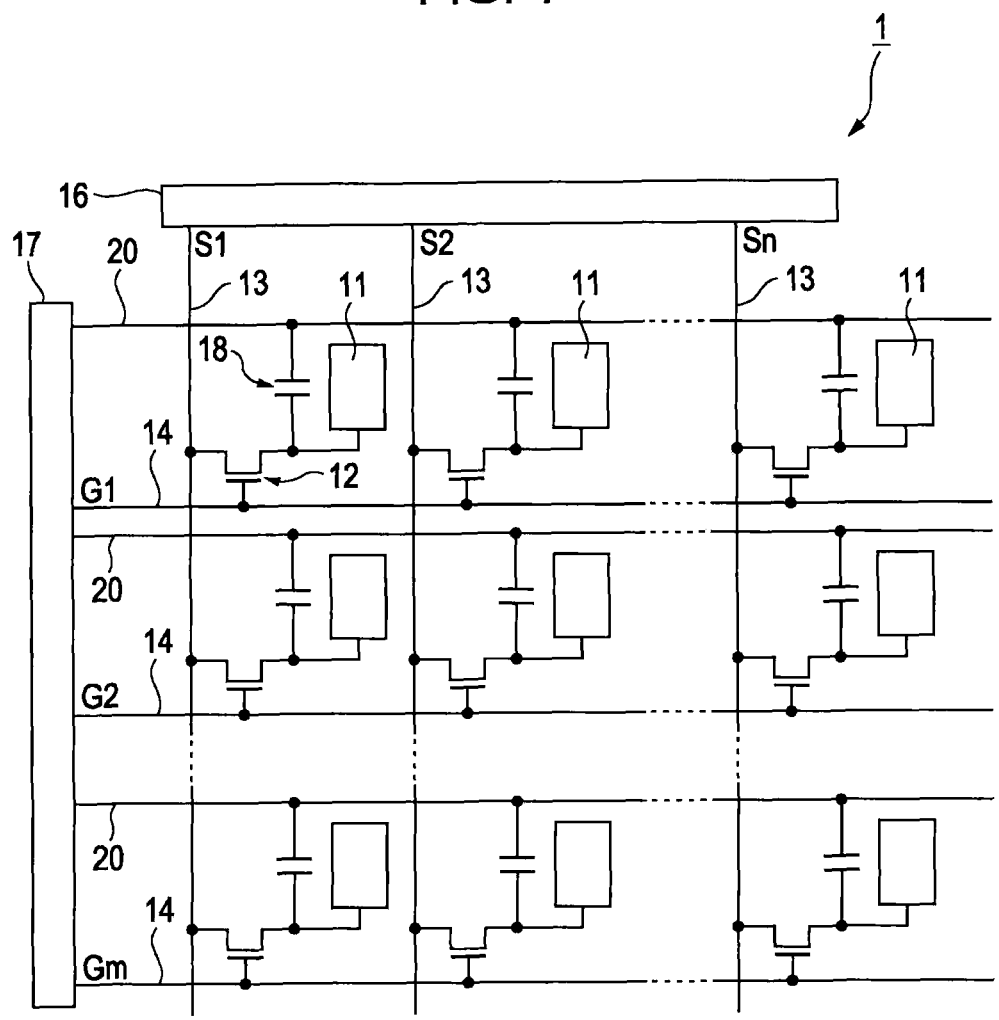
FIG. 1 is an equivalent circuit diagram of an liquid crystal device according to a first embodiment of the invention.
Figure 2:
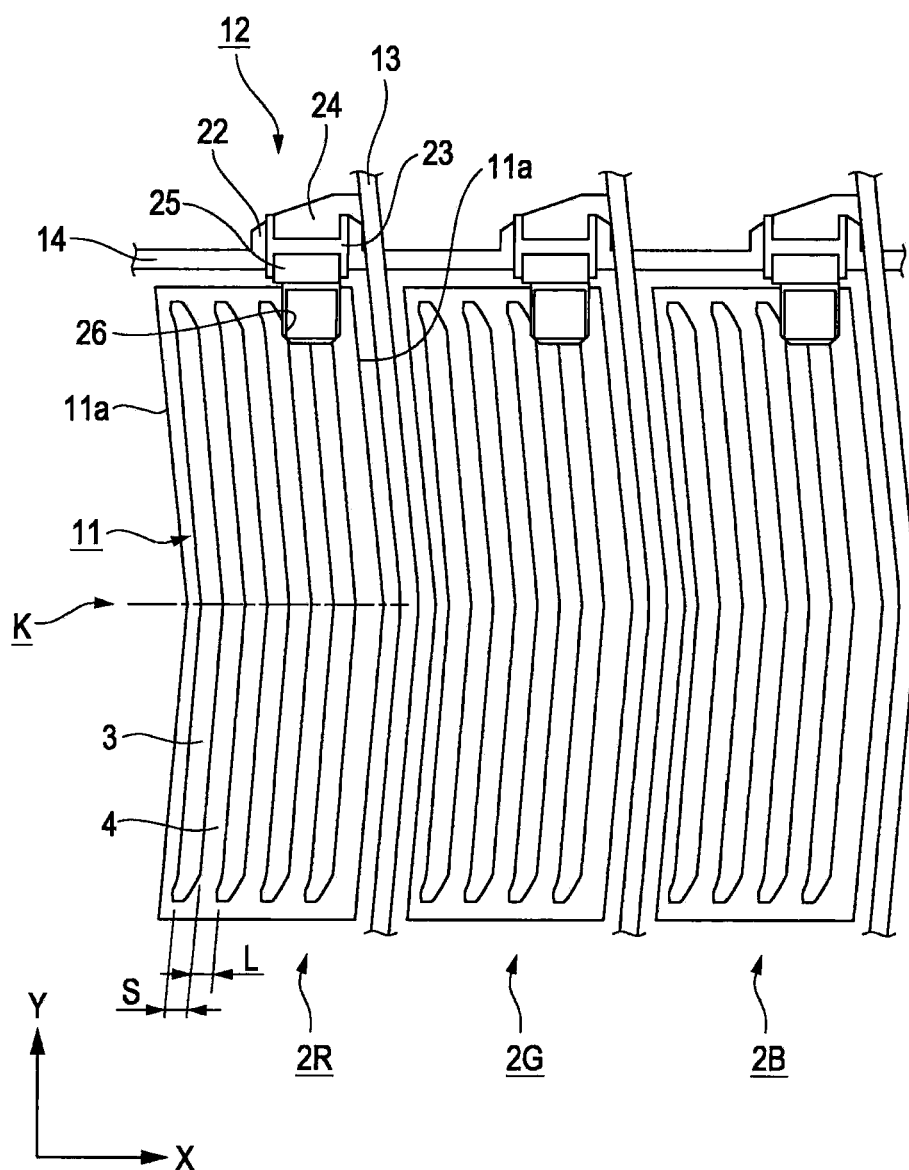
FIG. 2 is a plan view illustrating a configuration of one pixel of the liquid crystal device according to the first embodiment.
Figure 3:
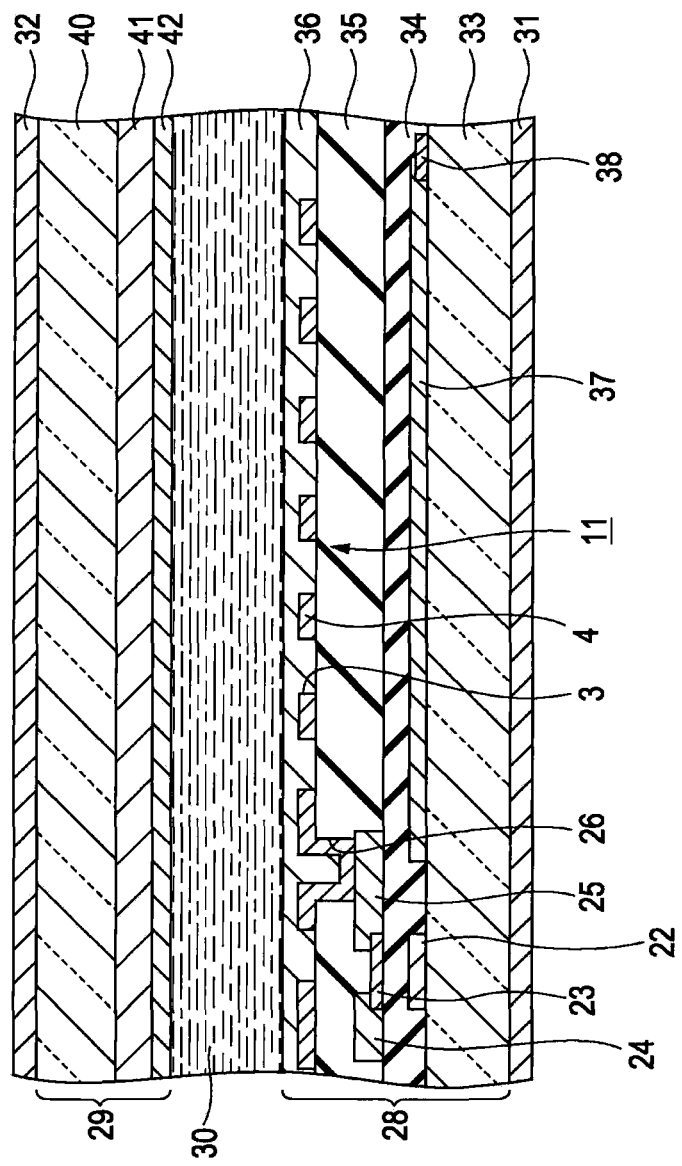
FIG. 3 is a cross-sectional view illustrating the configuration of one pixel of the liquid crystal device according to the first embodiment.

A liquid crystal device according to a first embodiment of the invention will be described herein below with reference to FIGS. 1 to 4. The liquid crystal device according to this embodiment is an example of a FFS mode color liquid crystal display device. FIG. 1 is an equivalent circuit diagram of the liquid crystal device according to this embodiment. FIG. 2 is a plan view illustrating a configuration of one pixel of the liquid crystal device. FIG. 3 is a cross-sectional view illustrating the configuration of one pixel of the liquid crystal device. In the drawings below, individual members are appropriately depicted with different reduced scales in order to make them large enough to be recognized on the drawings.

A liquid crystal device 1 according to this embodiment is a color liquid crystal display device in which one pixel is configured by three sub-pixels capable of outputting color light of red (R), green (G) and blue (B). Here, a display region which serves the minimum unit of display will be referred to as "sub-pixel," and a display region composed of a group (R, G and B) of sub-pixels will be referred to as "pixel." Further, in this specification, "a long-axis direction of the sub-pixel" corresponds to the Y-axis direction in FIG. 2. That is, "the long-axis direction of the sub-pixel" is defined not as a direction extending along an extending direction of bent portions of later-described pixel electrodes, but as a direction in which sub-pixels of the same color are arranged. Moreover, "a short-axis direction of the sub-pixel" corresponds to the X-axis direction perpendicular to the Y-axis direction in FIG. 2.

As illustrated in FIG. 1, in the liquid crystal device 1 according to this embodiment, pixel electrodes (second electrodes) 11 are provided to correspond to respective one of a plurality of sub-pixels 2R, 2G and 2B (see FIG. 2) which is arranged in a matrix to form a display region. Moreover, the pixel electrodes 11 are connected to pixel switching TFT (Thin Film Transistor) elements 12 for controlling the conduction state of the corresponding pixel electrodes 11. Data lines 13 are electrically connected to respective sources of the TFT elements 12. Image signals S1, S2, . . . , and Sn are supplied from a data line driving circuit 16 to the respective data lines 13. It is to be noted that capacitance lines 20 are not always necessary and may be provided as necessary.

Moreover, scan lines 14 are electrically connected to respective gates of the TFT elements 12. Scan signals G1, G2, . . . , and Gm are supplied in a pulsating manner at a predetermined timing from a scan line driving circuit 17 to the respective scan lines 14. The scan signals G1, G2, and Gm are applied in this order to the respective scan lines 14 in a line-sequential manner. Further, the pixel electrodes 11 are electrically connected to respective drains of the TFT elements 12. When the TFT elements 12 which are switching elements are turned on for only a predetermined period by the scan signals G1, G2, . . . , and Gm supplied from the scan lines 14, the image signals S1, S2, . . . , and Sn supplied from the data lines 13 are written to liquid crystals of respective pixels at a predetermined timing.

The image signals S1, S2, . . . , and Sn having a predetermined level having written to the liquid crystals are held for a predetermined period by liquid crystal capacitances formed between the pixel electrodes 11 and later-described common electrodes (first electrodes). Further, in order to prevent the held image signals S1, S2, . . . , and Sn from leaking, storage capacitances 18 are formed between the pixel electrodes 11 and the capacitance lines 20 so as to be parallel with the liquid crystal capacitances. When voltage signals are applied to the liquid crystals, the alignment state of the liquid crystal molecules is changed in accordance with the applied voltage level. In this way, light incident on the liquid crystals is modulated to perform gradation display.

Next, the configuration of the pixel of the liquid crystal device 1 according to this embodiment will be described. FIG. 2 is a plan view illustrating a pattern configuration of one pixel composed of three sub-pixels 2R, 2G and 2B of three colors R, G and B. As illustrated in FIG. 2, the pixel electrode 11 provided to each of the sub-pixels 2R, 2G and 2B has such a rectangular shape that is bent at the center in a long-axis direction thereof. Specifically, both sides of a bent portion K are bent to be inclined in opposite directions with respect to the long-axis direction of the sub-pixels 2R, 2G and 2B so that an upper half part thereof is inclined toward the top left corner in FIG. 2 while a lower half part thereof is inclined toward the bottom left corner.

Moreover, inside the pixel electrode 11, a plurality of slits (gaps) 3 is formed so as to extend in the same direction as an extending direction of an outer border 11a of the pixel electrode 11. That is, the slits 3 are bent so that both sides of the bent portion K are inclined in opposite directions with respect to the long-axis direction of the sub-pixels 2R, 2G and 2B in a manner similar to the sub-pixels 2R, 2G and 2B in which the upper half parts thereof are inclined toward the top left corner in FIG. 2 while the lower half parts thereof are inclined toward the bottom left corner. Although only four slits 3 are illustrated in FIG. 2 in order to make them large enough to be recognized on the drawings, many more slits may be formed in practical cases. As a result, linear electrodes 4 are formed by both sides of the slits 3.

In the case of this embodiment, a region disposed between bent portions K of two linear electrodes 4 adjacent in the short-axis direction of the sub-pixels 2R, 2G and 2B corresponds to the slit 3. That is, the slits 3 are formed between bent portions K of two adjacent linear electrodes 4, and the slits 3 are connected with each other across both sides of the bent portions K in the long-axis direction of the sub-pixels 2R, 2G and 2B. Further, in this embodiment, the width L of the linear electrodes 4 and the width S of the slits 3 are constant within the pixel electrode 11.

The TFT element 12 is provided at the top right corner of each of the sub-pixels 2R, 2G and 2B in FIG. 2. The TFT element 12 includes a gate electrode 22 formed to be integral with the scan line 14, a semiconductor layer 23, a source electrode 24 formed to be integral with the data line 13, and a drain electrode 25. Here, reference numeral 26 is a contact hole for electrically connecting the drain electrode 25 and the pixel electrode 11 to each other. The data line 13 is formed to be bent along the same direction as the extending direction of the linear electrode 4 having the bent portion K. In the case of this embodiment, since the extending direction of the linear electrode 4 is identical with the extending direction of the outer border 11a of the pixel electrode 11, the configuration can be restated as follows: the data line 13 is formed to be bent along the extending direction of the outer border 11a of the pixel electrode 11 with a predetermined gap from the outer border 11a of the pixel electrode 11. It is to be noted that the pixel electrode 11 may be bent so that both sides of the bent portion K are inclined in opposite direction to the long-axis direction of the sub-pixels 2R, 2G and 2B in a manner that the upper half part thereof is inclined toward the top right corner while the lower half part thereof is inclined toward the bottom right corner. Although it is preferable that the inclination angles are equal to each other, the inclination angles may be different from each other.

Next, a cross-sectional structure of the liquid crystal device 1 according to this embodiment will be described. As illustrated in FIG. 3, the liquid crystal device 1 includes an element substrate (first substrate) 28, a counter substrate (second substrate) 29 that is disposed to face the element substrate 28, a liquid crystal layer 30 that is sandwiched between the element substrate 28 and the counter substrate 29, a polarization plate 31 that is provided on an outer surface side (a side opposite the liquid crystal layer 30) of the element substrate 28, and a polarization plate 32 that is provided an outer surface side of the counter substrate 29. The liquid crystal device 1 is configured such that an illumination light is irradiated thereto from a backlight (not illustrated) disposed on the outer surface side of the element substrate 28. Further, in the liquid crystal device 1, sealing members (not illustrated) are provided along the circumferences of opposite surfaces of the element substrate 28 and the counter substrate 29, and the liquid crystal layer 30 is sealed within a space surrounded by the sealing members, the element substrate 28 and the counter substrate 29.

The element substrate 28 includes a substrate body 33 formed of a transparent material such as glass, quartz or plastic, and a gate insulating film 34, an interlayer insulating film 35 and an alignment film 36 for controlling an initial alignment direction (rubbing direction) of the liquid crystal layer 30, which are stacked in this order on a surface on an inner side (a side close to the liquid crystal layer 30) of the substrate body 33.

The element substrate 28 is provided with the gate electrode 22 (scan line 14) disposed on the inner surface of the substrate body 33, the common electrodes (first electrodes) 37 provided so as to correspond to each of the sub-pixels, common lines 38 configured to connect the common electrodes 37 with each other, the data line 13 (see FIG. 2) disposed on the inner surface of the gate insulating film 34, the semiconductor layer 23, the source electrode 24, the drain electrode 25, and the pixel electrode 11 disposed on the inner surface of the interlayer insulating film 35. The gate insulating film 34 is formed of a transparent material having insulating properties such as a silicon nitride or a silicon oxide so as to cover the scan lines 14, the common lines 38 and the common electrodes 37 formed on the substrate body 33.

The interlayer insulating film 35 is formed of a transparent material having insulating properties such as a silicon nitride or a silicon oxide, similar to the gate insulating film 34 so as to cover the semiconductor layer 23, the source electrodes 24 and the drain electrode 25 formed on the gate insulating film 34. Further, contact holes 26 which are through-holes for achieving conduction between the pixel electrodes 11 and the TFT elements 12 are formed at portion of the interlayer insulating film 35 where the drain electrodes 25 and the pixel electrodes 11 overlap with each other in plan view illustrated in FIG. 2. The alignment film 36 is formed of an organic material such as polyimide so as to cover the pixel electrodes 11 on the interlayer insulating film 35. Further, an alignment treatment for controlling the alignment of the liquid crystal molecules constituting the liquid crystal layer 30 is performed to the upper surface of the alignment film 36.

The counter substrate 29 includes a substrate body 40 formed of a transparent material such as glass, quartz or plastic, and colored layers 41 of color filters and an alignment film 42 which are stacked in this order on a surface on an inside (a side close to the liquid crystal layer 30) of the substrate body 40. The colored layers 41 are disposed so as to correspond to the sub-pixels 2R, 2G and 2B, are formed of acryl, for example, and contain coloring materials corresponding to colors to be displayed by the sub-pixels 2R, 2G and 2B. The alignment film 42 is formed of an organic material such as polyimide or an inorganic material such as a silicon oxide similar to the alignment film 36 and has an alignment direction thereof identical with an alignment direction of the alignment film 36.

Polarization plates 31 and 32 provided on outer surfaces of the respective substrates have transmission axes thereof being perpendicular to each other. Therefore, a transmission axis of one of the polarization plates is parallel with the alignment direction of the alignment film 36 while a transmission axis of the other polarization plate is perpendicular to the alignment direction of the alignment film 36.

In the liquid crystal device 1 according to this embodiment, since both sides (the upper and lower sides in FIG. 2) of the bent portion K of each of the linear electrodes 4 constituting the pixel electrode 11 have such a shape that is inclined in opposite directions, two domains are formed within one sub-pixel 2R, 2G or 2B, whereby it is possible to achieve a wide viewing angle. Moreover, since the linear electrodes 4 (or the slits 3) extend in the long-axis direction of the sub-pixels 2R, 2G and 2B, the respective parts of the linear electrodes 4 (or the slits 3) extend in a direction parallel with the outer border 11a of the pixel electrode 11, and the data line 13 is bent along the extending direction of the outer border 11a of the pixel electrode 11, it is possible to suppress generation of spaces, which do not contribute to display, at positions along the longer sides of the pixel electrode 11, thereby increasing the aperture ratio compared with the known example. Furthermore, in the case of this embodiment, since the slits 3 are connected with each other across both sides of the bent portions K, it is possible to further increase the aperture ratio. In this way, a liquid crystal device having a high display luminance can be provided. In addition, the sub-pixel is long in the extending direction of the data line 13. That is, the extending direction of the data line 13 corresponds to the long-axis direction of the sub-pixel. However, the sub-pixel may be long in the extending direction of the scan line 14. That is, when the extending direction of the scan line 14 corresponds to the long-axis direction of the sub-pixel, the linear electrodes are formed along the extending direction of the scan line 14.

Second Embodiment

Figure 4:
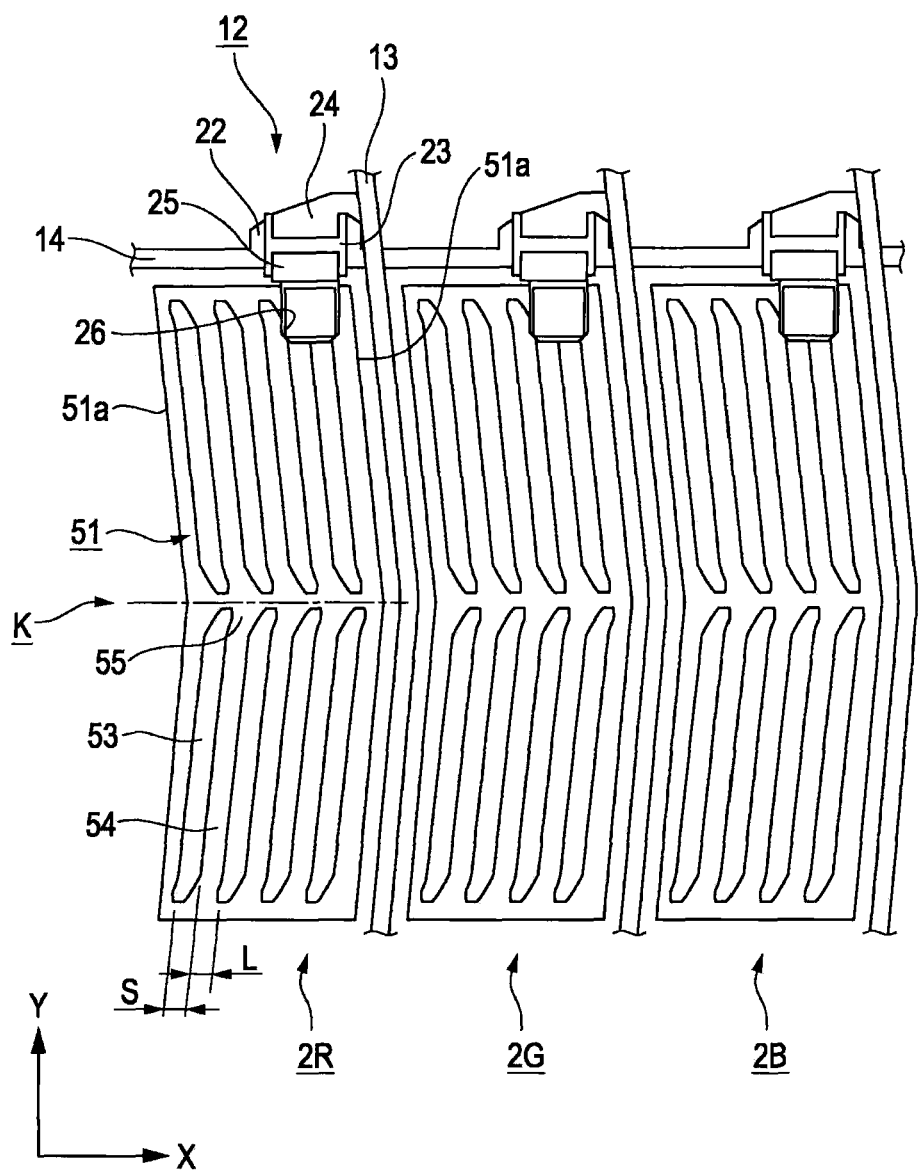
FIG. 4 is a plan view illustrating a configuration of one pixel of a liquid crystal device according to a second embodiment of the invention.

A liquid crystal device according to a second embodiment of the invention will be described herein below with reference to FIG. 4. A basic configuration of the liquid crystal device according to this embodiment is the same as that of the first embodiment, except that the pixel electrode is configured differently from that of the first embodiment. FIG. 4 is a plan view illustrating the configuration of one pixel of the liquid crystal device according to this embodiment. In FIG. 4, the same constituent elements as those of FIG. 2 used in the first embodiment will be denoted by the same reference numerals and the detailed descriptions thereof will be omitted.

In the first embodiment, the slits 3 formed within the pixel electrode 11 were formed to be connected with each other across both sides of the bent portions K. To the contrary, in the liquid crystal device according to this embodiment, as illustrated in FIG. 4, connection portions 55 are formed between the bent portions K of two linear electrodes 54 adjacent in the short-axis direction of the sub-pixels 2R, 2G and 2B so as to connect the two adjacent linear electrodes 54 with each other. That is, slits 53 are individually formed on both sides of the bent portions K and the slits 53 on both sides of the bent portions K are divided by the connection portions 55.

In the liquid crystal device according to this embodiment, it is possible to obtain the same advantage as the first embodiment that it is possible to provide a liquid crystal device capable of achieving a wide viewing angle, a high aperture ratio, and a high display luminance. If the slits 3 are connected with each other across both sides of the bent portions K as in the case of the first embodiment, there is a fear that it may cause problems that display defects resulting from an alignment disorder (disclination) of liquid crystals at the bent portions K may spread beyond expectation or that the display defects may be unstably transferred to other positions upon application of an external force to the liquid crystal device. To the contrary, according to the liquid crystal device of this embodiment, it is possible to solve the problems by dividing the slits 53 on both sides of the bent portions K by the connection portions 55.

Third Embodiment

Figure 5:
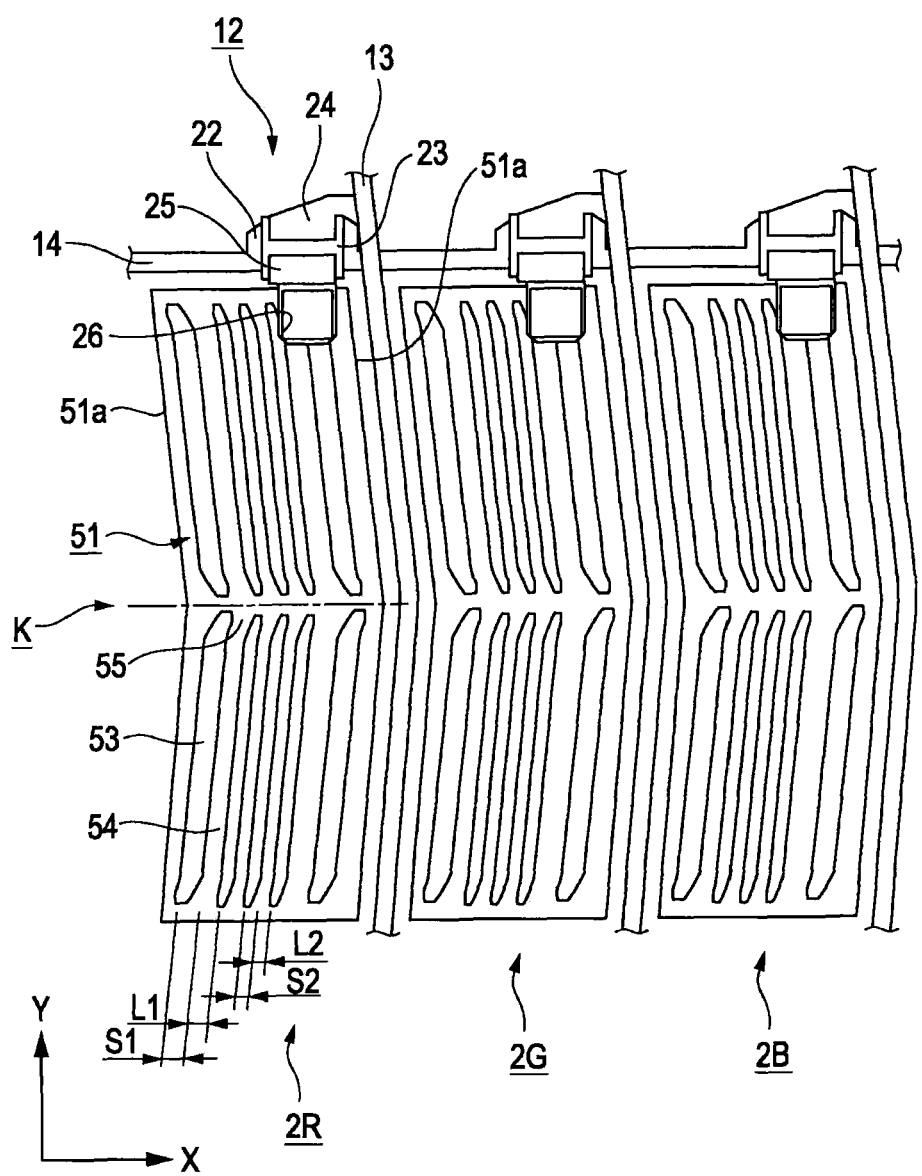
FIG. 5 is a plan view illustrating a configuration of one pixel of a liquid crystal device according to a third embodiment of the invention.

A liquid crystal device according to a third embodiment of the invention will be described herein below with reference to FIG. 5. A basic configuration of the liquid crystal device according to this embodiment is the same as that of the first and second embodiments, except that the pixel electrode is configured differently from that of the first and second embodiments. FIG. 5 is a plan view illustrating the configuration of one pixel of the liquid crystal device according to this embodiment. In FIG. 5, the same constituent elements as those of FIG. 2 used in the first embodiment will be denoted by the same reference numerals and the detailed descriptions thereof will be omitted.

In the first and second embodiments, the width L of the linear electrodes and the width S of the slits were constant within the pixel electrode. To the contrary, in the liquid crystal device according to this embodiment, as illustrated in FIG. 5, the width of the linear electrodes and the width of the slits are configured such that the width L1 of the linear electrode and the width S1 of the slit disposed at a region located in the vicinity of the circumference of the sub-pixel and close to the data line are relatively large while the width L2 of the linear electrode and the width S2 of the slit disposed at a region located in the vicinity of the center of the sub-pixel and distant from the data line are relatively small.

Further, although in this embodiment, both the width L of the linear electrodes and the width S of the slits are changed, only either one of them may be changed. Specifically, while maintaining the constant width of the linear electrodes within the pixel electrode, the width S1 of the slit disposed at a region located in the vicinity of the circumference of the sub-pixel and close to the data line may be relatively large, and the width S2 of the slit disposed at a region located in the vicinity of the center of the sub-pixel and distant from the data line may be relatively small. Alternatively, while maintaining the constant width of the slits within the pixel electrode, the width L1 of the linear electrode disposed at a region located in the vicinity of the circumference of the sub-pixel and close to the data line may be relatively large, and the width L2 of the linear electrode disposed at a region located in the vicinity of the center of the sub-pixel and distant from the data line may be relatively small.

In the liquid crystal device according to this embodiment, it is possible to obtain the same advantage as the first and second embodiments that it is possible to provide a liquid crystal device capable of achieving a wide viewing angle, a high aperture ratio, and a high display luminance.

Since the invention is characterized in that the data line is bent so as to extend along the outer border of the pixel electrode, although it is possible to provide a high aperture ratio, there is a fear that when a larger part of the outer border of the pixel electrode is located in close proximity of the data line, a crosstalk may occur between the data line and the pixel electrode, thus leading to display defects. Therefore, as in the case of this embodiment, when the width L1 and S1 of the linear electrode 54 and the slit 53 disposed at the region located in the vicinity of the circumference of the sub-pixel and close to the data line 13 are larger than the width L2 and S2 of the linear electrode 54 and the slit 53 disposed at the region located in the vicinity of the center of the sub-pixel and distant from the data line 13, it is possible to make the potential of the pixel electrode 51 less likely to be influenced by the data line 13 to thereby suppress the occurrence of the crosstalk.

Fourth Embodiment

Figure 6:
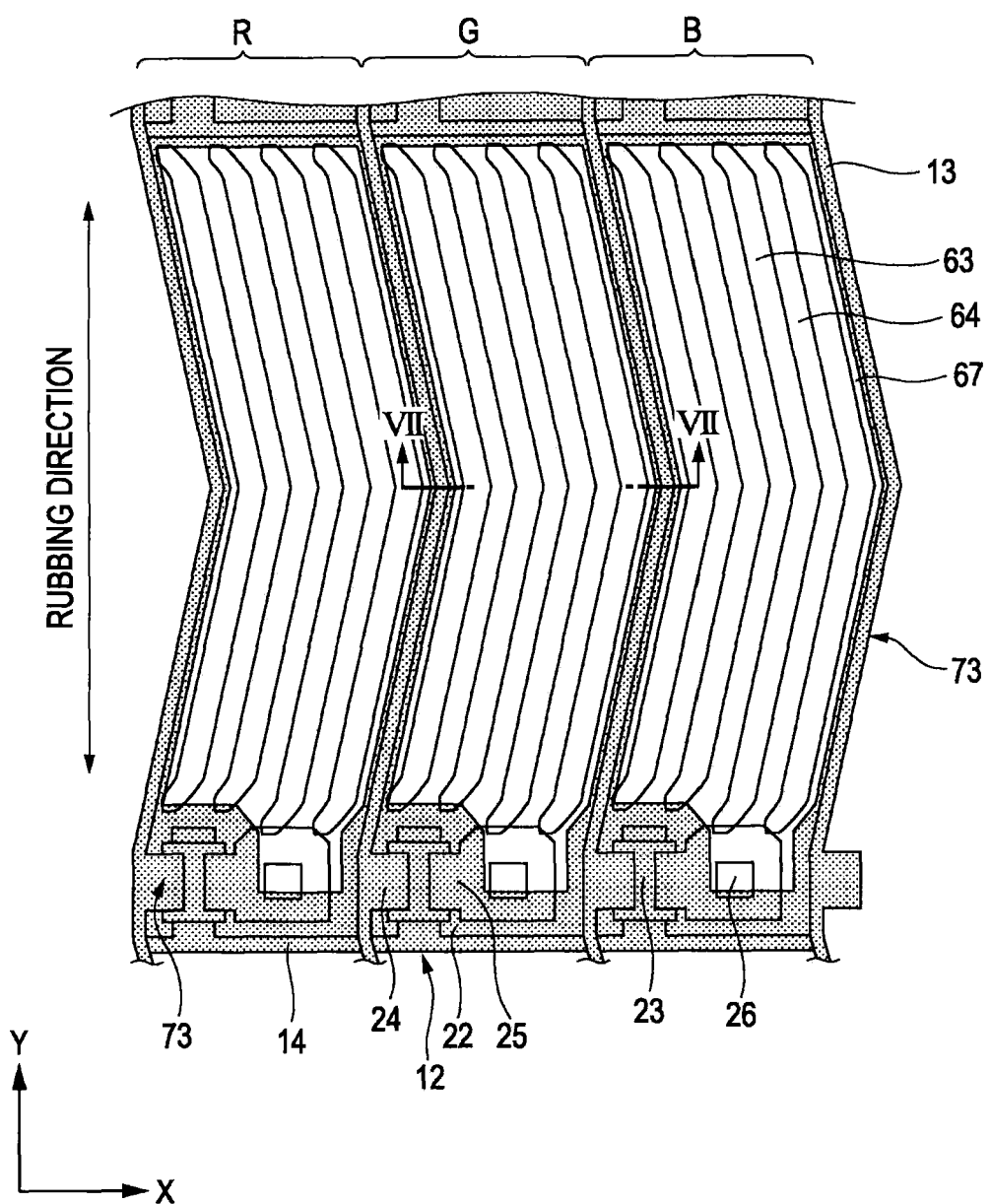
FIG. 6 is a plan view illustrating a configuration of one pixel of a liquid crystal device according to a fourth embodiment of the invention.
Figure 7:
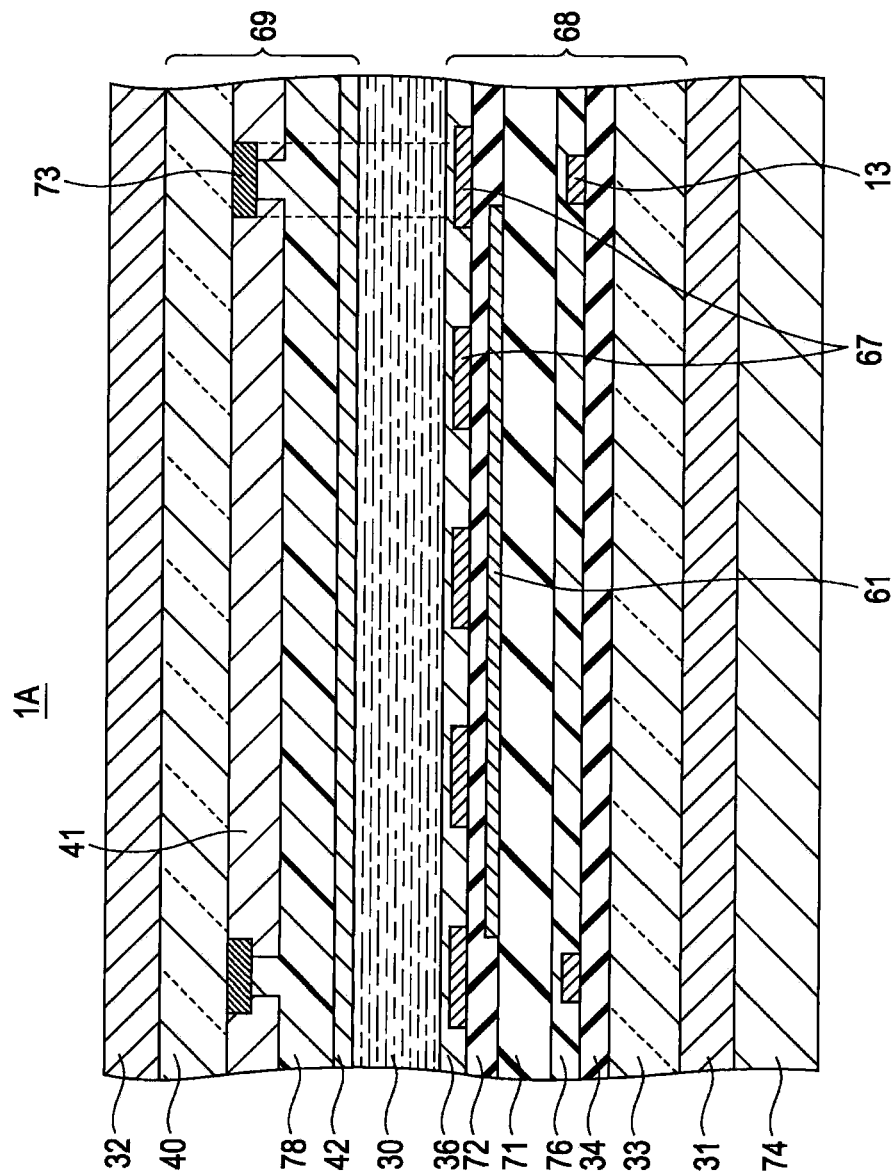
FIG. 7 is a cross-sectional view illustrating the configuration of one pixel of the liquid crystal device according to the fourth embodiment.
Figure 8:
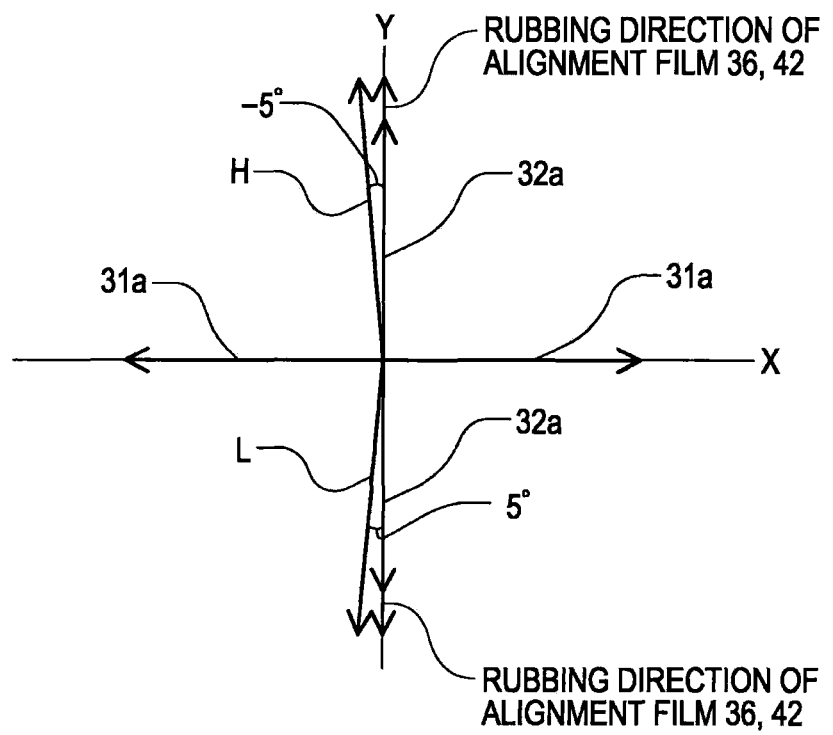
FIG. 8 is a diagram illustrating an arrangement of optical axes of the liquid crystal device according to the fourth embodiment.

A liquid crystal device according to a fourth embodiment of the invention will be described herein below with reference to FIGS. 6 to 8. A basic configuration of the liquid crystal device according to this embodiment is the same as that of the first to third embodiments, except that the positional relationship of the electrodes is different from that of the first to third embodiments. FIG. 6 is a plan view illustrating the configuration of one pixel of the liquid crystal device according to this embodiment. FIG. 7 is a cross-sectional view illustrating the configuration of one pixel of the liquid crystal device. FIG. 8 is a diagram illustrating the arrangement of optical axes of the liquid crystal device. In the drawings below, individual members are appropriately depicted with different reduced scales in order to make them large enough to be recognized on the drawings. Moreover, the same constituent elements as those of the first to third embodiments will be denoted by the same reference numerals and the detailed descriptions thereof will be omitted.

In the first to third embodiments, the common electrode was provided on a lower surface side (substrate body side) of the element substrate, and the pixel electrode was provided on an upper layer side (liquid crystal layer side) of the element substrate. To the contrary, in the liquid crystal device according to this embodiment, as illustrated in FIG. 7, a pixel electrode (first electrode) 61 is provided on a lower surface side (a side close to the substrate body 33) of an element substrate (first substrate) 68, and common electrode (second electrode) 67 are provided on an upper layer side (a side close to the liquid crystal layer 30) of the element substrate 68. Therefore, as illustrated in FIG. 6, the common electrode 67 includes linear electrodes 64 and slits 63.

More specifically, in the liquid crystal device 1A, as illustrated in FIG. 7, the liquid crystal layer 30 is sandwiched between the element substrate 68 and the counter substrate 69. Although not illustrated, the thickness of the liquid crystal layer 30 is maintained constant by a spacer. A polarization plate 31 is formed on an outer surface of the element substrate 68, and a polarization plate 32 is formed on an outer surface of the counter substrate 69. Further, a backlight 74 is arranged so as to irradiate light toward the outer surface side of the element substrate 68.

First, a configuration of the element substrate 68 will be described. The element substrate 68 has a substrate body 33 as its base. On a surface of the substrate body 33 of the element substrate 68 close to the liquid crystal layer 30, scan lines 14 which are branched from the gate electrodes 22 are formed so as to extend in the X-axis direction in FIG. 6, and a gate insulating film 34 is formed so as to cover the gate electrodes 22 and the scan lines 14. A semiconductor layer 23 is formed on the gate insulating film 34 so as to face the gate electrodes 22, and a source electrode 24 and a drain electrode 25 are formed so as to partially cover the semi-conductor layer 23. In this way, TFT elements 12 are formed by the semiconductor layer 23, the gate electrodes 22, the source electrodes 24 and the drain electrodes 25. The source electrodes 24 are branched from the data lines 13, and the data electrodes 13 extend in the Y-axis direction in FIG. 6.

A passivation film 76 formed of a silicon oxide or a silicon nitride so as to cover the semiconductor layer 23, the source electrodes 24 and the drain electrodes 25, and a first interlayer insulating film 71 is formed so as to cover the passivation film 76. Moreover, pixel electrodes 61 formed of a transparent conductive material are formed individually for each sub-pixel so as to cover the first interlayer insulating film 71. Contact holes 26 are formed to penetrate through the passivation film 76 and the first interlayer insulating film 71 and reach the drain electrodes 25 so that the pixel electrodes 61 and the drain electrodes 25 are electrically connected to each other via the contact holes 26.

A second interlayer insulating film 72 is formed so as to cover the pixel electrodes 61. Common electrodes 67 formed of a transparent conductive material are formed on a surface of the second interlayer insulating film 72 close to the liquid crystal layer 30. The common electrode 67 is formed over the entire sub-pixels and acts as a counter electrode. The common electrode 67 includes linear electrodes 64 formed by a plurality of slits 63 extending approximately in the Y-axis direction in FIG. 6. The slits 63 are formed by etching the common electrode 67 by means of a photolithographic method. A storage capacitance is formed between the pixel electrode 61 and the common electrode 67 with the second interlayer insulating film 72 sandwiched between the pixel electrode 61 and the common electrode 67 being used as a dielectric film. Further, an alignment film 36 is formed so as to cover the common electrode 67 and the second interlayer insulating film 72. A rubbing treatment is performed to the alignment film 36 in a predetermined direction.

Next, a configuration of the counter substrate 69 will be described. The counter substrate 69 has a substrate body 40 as its base, and colored layers 41 of color filters capable of passing therethrough different color light (for example, R, G, B, white, and the like) for each sub-pixel and a black matrix (light shielding film) 73 as a light shielding member are formed on the substrate body 40. A protective resin layer 78 is formed so as to cover the colored layers 41 and the black matrix 73, and an alignment film 42 is formed so as to cover the protective resin layer 78. A rubbing treatment is performed to the alignment film 42 in a direction opposite to that of the alignment film 36.

Here, the arrangement of the optical axes will be described. As illustrated in FIG. 8, a transmission axis 31a of the polarization plate 31 on the element substrate 68 and a transmission axis 32a of the polarization plate 32 on the counter substrate 69 are arranged so as to be perpendicular to each other, and the transmission axis 32a of the polarization plate 32 is arranged to be parallel with the Y-axis direction in FIG. 6. Moreover, the rubbing direction of the alignment film 36 is parallel with the transmission axis 32a of the polarization plate 32. Further, the rubbing direction of the alignment film 36 intersects the principal direction of an electric field generated between the common electrode 67 and the pixel electrode 61. In addition, the liquid crystal molecules which were parallelly aligned along the rubbing direction in an initial state are rotated to be aligned toward the principal direction of the electric field in response to application of an electric voltage between the common electrode 67 and the pixel electrode 61. Based on a difference between the initial alignment state and the alignment state during voltage application, brightness is represented for each of the sub-pixels. In this way, the sub-pixels are driven to display images. Although not illustrated, the liquid crystal layer 30 is sealed within a sealing area formed by sealing member provided between the element substrate 68 and the counter substrate 69. The slits 63 extend in the vertical direction (Y-axis direction in FIG. 6).

Here, the rotation direction of the liquid crystals of the liquid crystal layer 30 in the slits 63 will be described. The electric field applied to the liquid crystal layer 30 is generated by a potential difference between the common electrode 67 and the pixel electrode 61 located in the slits 63. The electric field is generated approximately in parallel with the plane of the element substrate 68, and the direction of the electric field in plan view corresponds to a normal direction of the sides of the slits 63. When there is no potential difference between the common electrode 67 and the pixel electrode 61, that is, when the electric field is in an OFF state, the alignment direction of the liquid crystals corresponds to the rubbing direction. When the electric field is in an ON state, the alignment direction of the liquid crystals corresponds to the normal direction of the sides of the slits 63. When the electric field changes from the OFF state to the ON state, the liquid crystals rotate in a direction where a rotation angle thereof is small. Therefore, when the potential difference between the common electrode 67 and the pixel electrode 61 changes from an OFF state to an ON state, the liquid crystals on the lower half part rotate in the counter-clockwise direction and the liquid crystals on the upper half part rotate in the clockwise direction.

Since the color sub-pixel is vertically long, when the slits 63 are arranged to extend in the horizontal direction, the number of both ends of the slits 63 may increase. Therefore, in the liquid crystal device 1A according to this embodiment, as illustrated in FIG. 6, the extending direction of the slits 63 corresponds to the vertical direction (Y-axis direction) so that the number of end portions of the slits 63 is decreased, and thus, a decrease in the aperture ratio is suppressed.

If the entire slits 63 are inclined in the clockwise direction or the counter-clockwise direction, the liquid crystal molecules may be twisted in one direction, and thus, a phenomenon that images are displayed in different colors depending on viewing directions may occur. This is because a visual retardation changes depending on directions where liquid crystal molecules are observed. In order to suppress such a problem, in the liquid crystal device 1A according to this embodiment, there are provided a domain where the extending direction of the slits 63 is inclined in the clockwise direction at an angle range of +3 to +10 degree with respect to the Y axis and a domain having an inclination angle range of −3 to −10 degree. That is, a multi-domain structure in which the linear electrodes 64 have a chevron shape is realized. For example, as illustrated in FIG. 8, a domain where the extending direction L of the lower half part of the slit 63 is inclined in the clockwise direction at an angle of +5 degree with respect to the Y axis and a domain where the extending direction H of the upper half part thereof is inclined at an angle of −5 degree, whereby a multi-domain structure is realized. Although in the liquid crystal device 1A according to this embodiment, the number of domains having different alignment directions is two, many more domains having different alignment directions may be provided. In addition, the invention is not limited to the case where the extending direction of the lower half part of the slit 63 is inclined at the angle of +5 degree, but the lower half part of the slit may be formed by connecting a portion extending at an inclination angle of +10 degree and a portion extending at an inclination angle of +5 degree with each other. In such a case, similarly, as for the extending direction of the upper half part of the slit 63, the upper half part of the slit may be formed by connecting a portion extending at an inclination angle of −10 degree and a portion extending at an inclination angle of −5 degree. Moreover, in such a case, the data line 13 may be shaped to be inclined along the slit 63.

Next, the relationship between the slits 63 of the common electrode 67 and the black matrix 73 will be described. The common electrode 67 is formed across the entire sub-pixels, and portions that are not hatched in FIG. 6 are the slits 63 of the common electrode 67. The shaded portion is the black matrix 73. As illustrated in FIGS. 6 and 7, the common electrode 67 overlaps with the black matrix 73 as viewed in plan view, and the slits 63 are formed so as not to overlap with the black matrix 73 as viewed in plan view.

Moreover, the black matrix 73 and the data lines 13 are arranged to extend in parallel with the slits 63. Therefore, it is possible to decrease the regions which do not contribute to display compared with a liquid crystal device having data lines extending in parallel with the Y axis, thereby increasing the aperture ratio.

Modification

Figure 9:
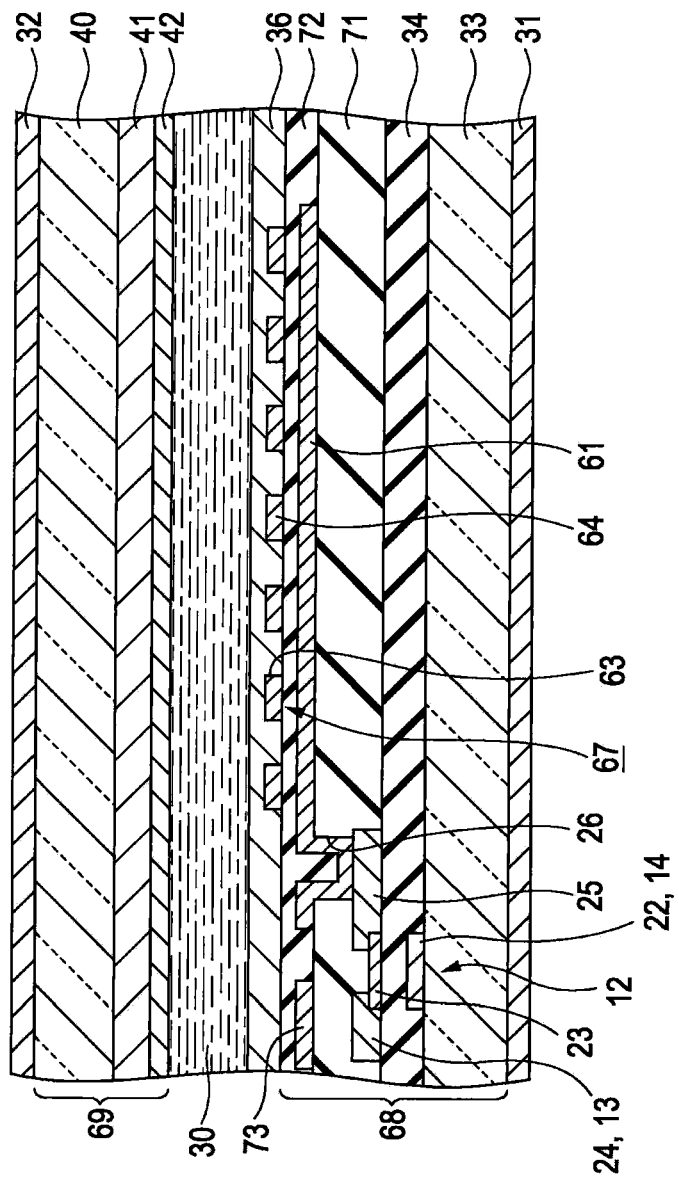
FIG. 9 is a cross-sectional view of a liquid crystal device according to a modification.

A liquid crystal device according to a modification will be described herein below with reference to FIG. 9. A basic configuration of the liquid crystal device according to this modification is the same as that of the first to third embodiments, except that the positional relationship of the electrodes is different from that of the first to third embodiments. FIG. 9 is a cross-sectional view of the liquid crystal device according to the modification. In FIG. 9, the same constituent elements as those of FIG. 3 used in the first embodiment will be denoted by the same reference numerals and the detailed descriptions thereof will be omitted.

In the first to third embodiments, the common electrode was provided on a lower surface side (substrate body side) of the element substrate, and the pixel electrode was provided on an upper layer side (liquid crystal layer side) of the element substrate. To the contrary, in the liquid crystal device according to this modification, as illustrated in FIG. 9, a pixel electrode (first electrode) 61 is provided on a lower surface side (a side close to the substrate body 33) of an element substrate (first substrate) 68, and common electrode (second electrode) 67 are provided on an upper layer side (a side close to the liquid crystal layer 30) of the element substrate 68. Therefore, the common electrode 67 includes linear electrodes 64 and slits 63.

More specifically, the first interlayer insulating film 71 is formed so as to cover the TFT element 12, and a beta-shaped pixel electrode 61 is formed on the first interlayer insulating film 71. The pixel electrode 61 and the drain electrode 25 are electrically connected to each other via the contact hole 26 penetrating through the first interlayer insulating film 71. The second interlayer insulating film 72 is formed so as to cover the pixel electrode 61, and the common electrode 67 having a plurality of linear electrodes 64 is formed on the second interlayer insulating film 72. The alignment film 36 is formed so as to cover the common electrode 67. Moreover, a black matrix 73 is formed on the first interlayer insulating film 71 so as to cover the data lines 13, the scan lines 14, the TFT elements 12, and the like.

In addition, when the common electrode 67 is used as the second electrode as in the case of this modification, rather than providing the common electrode 67 formed on the second interlayer insulating film 72 to be divided for each of the sub-pixels, a configuration may be used in which the common electrode 67 is formed over the entire display regions of the liquid crystal display device, and in which the linear electrodes 64 and the slits 63 are formed for each of the sub-pixels.

In the liquid crystal device according to this modification, it is possible to obtain the same advantage as the first to third embodiments that it is possible to provide a liquid crystal device capable of achieving a wide viewing angle, a high aperture ratio, and a high display luminance.

Moreover, in accordance with the invention, the data lines are bent so as to comply with the shape of the electrode having the linear electrodes, whereby the dead spaces which do not contribute to display are reduced in the regions disposed along the data lines, and thus, the aperture ratio is increased. However, in the case where the black matrix is formed on the counter substrate side, the positional alignment accuracy between the data lines and the black matrix is not high enough because the accuracy depends on the bonding accuracy of the two substrates. As a result, the thus-obtained advantage of an improvement in the aperture ratio may fade away.

To the contrary, according to the configuration of this modification, since the data lines 13 and the black matrix 73 are formed on the element substrate 68, unlike a case where the data lines and the black matrix are formed on different substrates, the positional alignment accuracy between the data lines 13 and the black matrix 73 may depend on the alignment accuracy of the photographic process, which is much higher than the bonding accuracy of the substrates. Therefore, the positional alignment between the data lines 13 and the black matrix 73 can be performed with a high accuracy, and thus, a high aperture ratio can be maintained.

Electronic Apparatus

Figure 10:
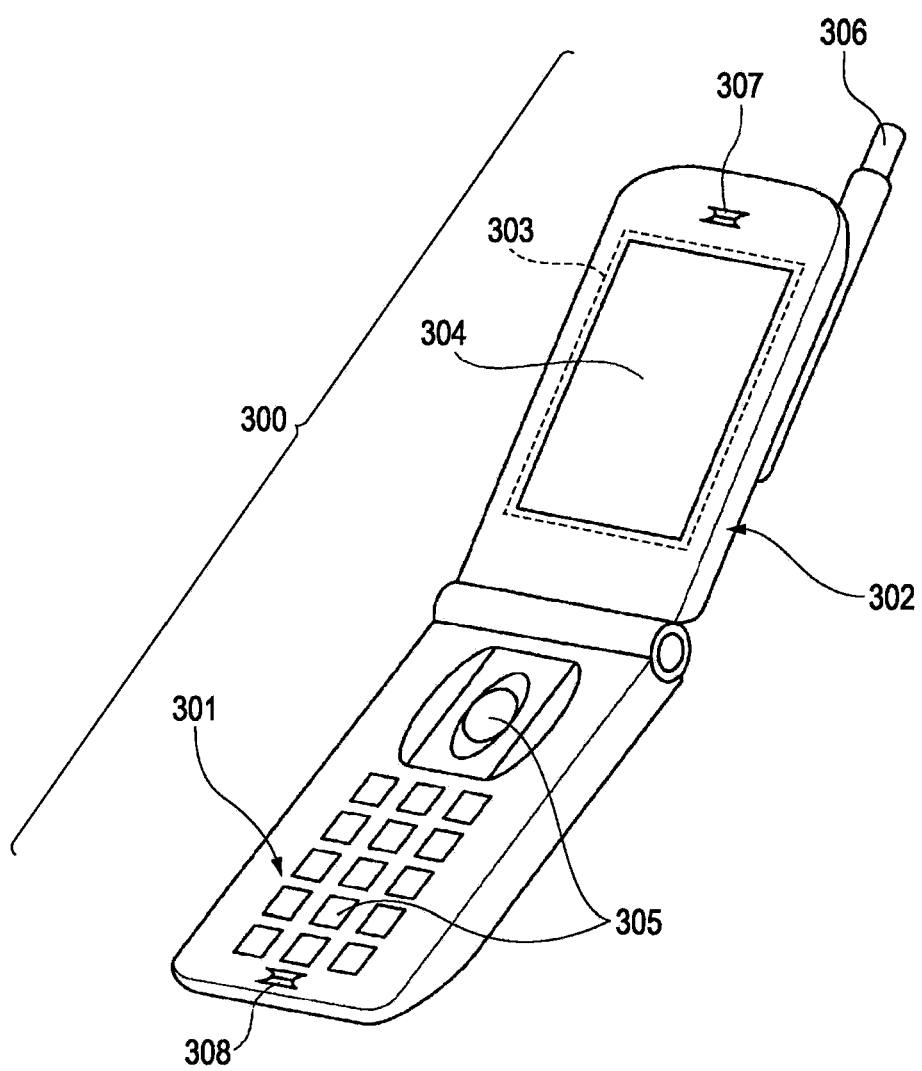
FIG. 10 is a perspective view illustrating an example of an electronic apparatus according to the invention.
Figure 11:
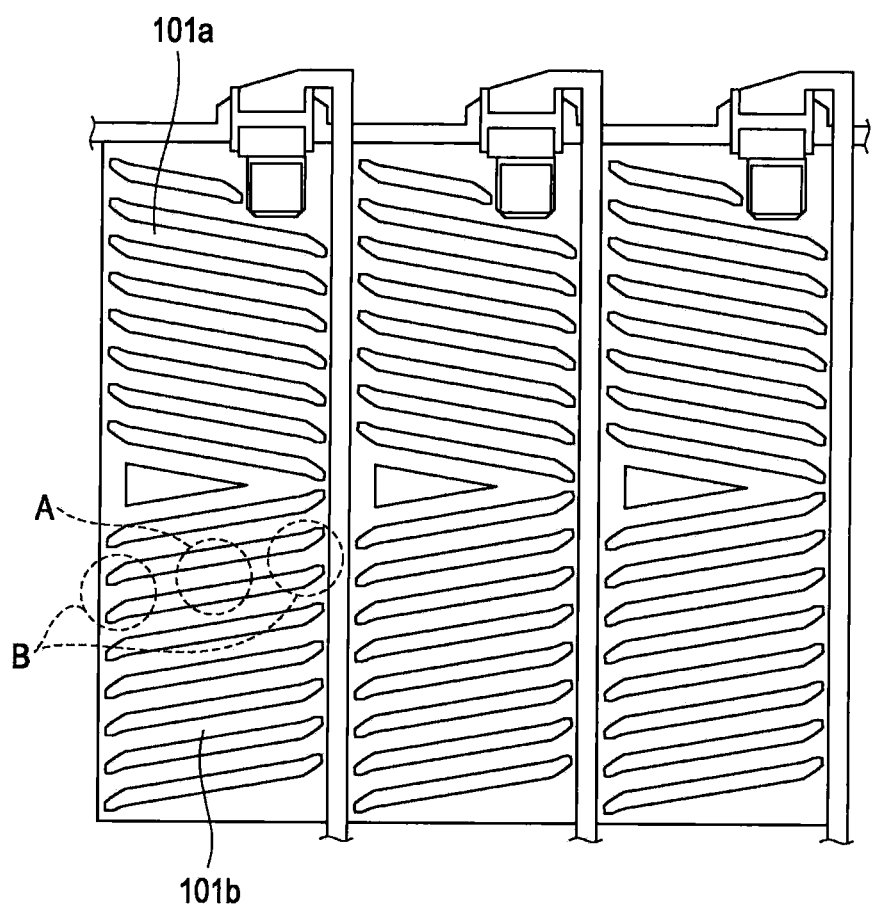
FIG. 11 is a plan view illustrating an example configuration of a pixel of a known lateral electric field mode liquid crystal device.

Next, an electronic apparatus having the above-described liquid crystal device will be described. FIG. 10 is a perspective view of a cellular phone as an example of the electronic apparatus having the liquid crystal device according to the invention. As illustrated in FIG. 10, the cellular phone 300 includes a body portion 301 and a display portion 302 configured to be opened and closed with respect to the body portion 301. A display 303 is disposed in an inner portion of the display portion 302, and various icons, characters and images related to phone calls are displayed on a display screen 304. Moreover, manipulation buttons 305 are arranged on the body portion 301.

Further, an antenna 306 is attached to one end portion of the display portion 302 to be freely extended and contracted. A speaker (not illustrated) is installed inside an earpiece part 307 that is provided on an upper portion of the display portion 302. Further, a microphone (not illustrated) is installed inside a mouthpiece part 308 that is provided on the lower end portion of the body portion 301. Here, the liquid crystal device according to the above embodiment is used as the display 303.

In accordance with the cellular phone of this embodiment, since the cellular phone is provided with the liquid crystal device according to the above-described embodiment, it is possible to realize a cellular phone having a liquid crystal display unit capable of achieving a high display luminance and a wide viewing angle.

The electronic apparatus having the liquid crystal device is not limited to the cellular phone but other electronic apparatuses may be used such as a personal computer, a notebook type personal computer, a workstation, a digital camera, a vehicle-mounted monitor, a car navigation apparatus, a head-mounted display, a digital video camera, a television receiver, a view-finder type or monitor-direct-view type video tape recorder, a pager, a electronic note, an electronic calculator, an electronic book, a projector, a word processor, a video phone, a POS terminal, or an apparatus equipped with a touch panel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A liquid crystal device, comprising:
a first substrate and a second substrate that are disposed to face each other, the first substrate including a plurality of data lines and a plurality of scan lines intersecting the data lines;
a liquid crystal layer that is sandwiched between the first substrate and the second substrate;
a first electrode that is provided on a liquid crystal layer side of the first substrate;
an insulating layer that is provided on the liquid crystal layer side of the first electrode; and
a second electrode that is provided on the liquid crystal layer side of the insulating layer,
wherein:
sub-pixels are formed at regions surrounded by the data lines and the scan lines;
the second electrode has a plurality of gaps and a plurality of linear electrodes;
the gaps have a first bent portion, a second bent portion, a third bent portion, a fourth bent portion, a first linear portion, and a second linear portion, and the gaps include a first gap and a second gap, the first gap having the first bent portion, the third bent portion, and the first linear portion, and the second gap having the second bent portion, the fourth bent portion, and the second linear portion;
the first bent portion is connected to one end of the first linear portion, the third bent portion is connected to an other end of the first linear portion, the second bent portion is connected to one end of the second linear portion, the fourth bent portion is connected to an other end of the second linear portion,
the first bent portion and the third bent portion are inclined with respect to the first linear portion and are substantially parallel with each other,
the second bent portion and the fourth bent portion are inclined with respect to the second linear portion and are substantially parallel with each other,
the first bent portion faces the second bent portion at a substantially central portion of each of the sub-pixels in a long-axis direction of the sub-pixel,
the first linear portion extends from the first bent portion in a first direction,
the second linear portion extends from the second bent portion in a second direction different from the first direction, and
the entirety of each gap is bordered by material of the second electrode.

2. The liquid crystal device according to claim 1, wherein the second electrode has the linear electrodes with the gaps therebetween, and
each of the linear electrodes is linearly symmetric about a short-axis direction of the respective sub-pixels.

3. The liquid crystal device according to claim 1, wherein the second electrode has the linear electrodes with the gaps therebetween,
two adjacent linear electrodes included in the linear electrodes each include a bent portion, and
a region disposed between the bent portions of the two linear electrodes in a short-axis direction of the respective sub-pixels is one of the gaps that is between the two adjacent linear electrodes.

4. The liquid crystal device according to claim 1, wherein
the second electrode has the linear electrodes with the gaps therebetween,
two adjacent linear electrodes included in the linear electrodes each include a bent portion, and
a connection portion is provided to a region disposed between bent portions of the two linear electrodes in a short-axis direction of the respective sub-pixels so as to connect the two adjacent linear electrodes with each other.

5. The liquid crystal device according to claim 1, wherein
the second electrode has the linear electrodes with the gaps therebetween,
the data lines or the scan lines extend in the first direction and are bent in the first direction in plan view, and
among the linear electrodes and the gaps alternately arranged in a short-axis direction of the respective sub-pixels, the linear electrode and the gap disposed at a region located close to one of the bent data lines or one of the bent scan lines has a width larger than a width of the linear electrode and the gap disposed at a region located distant from the bent data line or the bent scan line.

6. The liquid crystal device according to claim 1, wherein
the second electrode has the linear electrodes with the gaps therebetween,
the data lines or the scan lines extend in the first direction and are bent in the first direction in plan view, and
among the linear electrodes arranged in a short-axis direction of the respective sub-pixels, the linear electrode disposed at a region located close to one of the bent data lines or one of the bent scan lines has a width larger than a width of the linear electrode disposed at a region located distant from the bent data line or the bent scan line.

7. The liquid crystal device according to claim 1, wherein
the data lines or the scan lines extend in the first direction and are bent in the first direction in plan view, and
among the gaps arranged in a short-axis direction of the respective sub-pixels, the gap disposed at a region located close to one of the bent data lines or one of the bent scan lines has a width larger than a width of the gap disposed at a region located distant from the bent data line or the bent scan line.

8. The liquid crystal device according to claim 1, wherein a light shielding film is arranged to extend in parallel with the gaps.

9. The liquid crystal device according to claim 8, wherein the light shielding film is formed so as not to overlap with the gaps.

* * * * *